United States Patent [19]

Schreckenberg et al.

[11] 4,435,544

[45] Mar. 6, 1984

[54] MIXTURES OF POLYCARBONATE ELASTOMERS, CONTAINING HYDROGENATED DIMERIC FATTY ACID ESTERS AS CONDENSED UNITS, AND POLYOLEFINES AND, OPTIONALLY, OTHER POLYCARBONATES

[75] Inventors: Manfred Schreckenberg; Werner Nouvertne; Harald Medem; Rolf Dhein; Peter R. Müller, all of Krefeld-Uerdingen, Fed. Rep. of Germany

[73] Assignee: Bayer Aktiengesellschaft, Leverkusen, Fed. Rep. of Germany

[21] Appl. No.: 429,329

[22] Filed: Sep. 30, 1982

[30] Foreign Application Priority Data

Oct. 21, 1981 [EP] European Pat. Off. ........ 81108608.1

[51] Int. Cl.$^3$ ..................... C08L 69/00; C08L 23/04; C08L 23/06

[52] U.S. Cl. ..................... 525/146; 525/147

[58] Field of Search ................. 525/147, 146

[56] References Cited

U.S. PATENT DOCUMENTS

| 3,431,224 | 3/1969 | Goldblum | 525/146 |
| 3,801,673 | 4/1974 | O'Connell | 525/147 |
| 3,813,358 | 5/1974 | O'Connell | 525/146 |
| 4,358,563 | 11/1982 | Quinn et al. | 525/146 |

FOREIGN PATENT DOCUMENTS 2935317   3/1981   Fed. Rep. of Germany .

Primary Examiner—Carman J. Seccuro
Attorney, Agent, or Firm—Connolly and Hutz

[57] ABSTRACT

The present invention relates to mixtures of polycarbonates containing hydrogenated dimeric fatty acid esters as condensed units, and polyolefines and, if appropriate, other high-molecular weight, aromatic thermoplastic polycarbonates.

11 Claims, No Drawings

MIXTURES OF POLYCARBONATE ELASTOMERS, CONTAINING HYDROGENATED DIMERIC FATTY ACID ESTERS AS CONDENSED UNITS, AND POLYOLEFINES AND, OPTIONALLY, OTHER POLYCARBONATES

Polycarbonate elastomers containing hydrogenated dimeric fatty acid esters as condensed units are disclosed in German Offenlegungsschrift (German Published Specification) No. 2,935,317; in addition, it has already been mentioned in this publication that polycarbonates of this type can be admixed with other polycarbonate elastomers or with other thermoplastics, such as, for example, bisphenol A polycarbonates.

Admixtures of thermoplastic polycarbonates with polyester carbonates and/or polyether carbonates are disclosed in European Offenlegungsschrift (European Published Specification) No. 4,020.

Admixtures of thermoplastic polycarbonates with polyolefines, such as polyethylene, polypropylene or polyisobutylene, are also known (U.S. Pat. No. 3,431,224). According to U.S. Pat. No. 3,813,358, mixtures of this type are further modified by the addition of a third component which represents a graft polymer on polybutadiene.

The present invention relates to mixtures of (a) high-molecular weight, segmented, thermoplastically processable, aromatic polycarbonates containing 5 to 70% by weight, preferably 20 to 65% by weight, of hydrogenated dimeric fatty acid esters as condensed units, and if appropriate, (b) other high-molecular weight, aromatic, thermoplastic polycarbonates, characterised in that they contain (c) thermoplastic polyolefines, in particular polyethylene.

In the mixtures according to the invention, the sum of the components (a)+(b) in amounts by weight is from 98% by weight to 90% by weight, preferably 97% by weight to 94% by weight, and the amounts by weight of component (c) are from 2 to 10% by weight, preferably from 3 to 6% by weight, relative to the total amount by weight of (a)+(b)+(c), which makes up 100% by weight in each case.

The sum of the components (a)+(b) in turn contains the hydrogenated dimeric fatty acid ester radicals, as condensed units, in amounts by weight from 3 to 30% by weight, preferably 5% by weight to 20% by weight. Under these preconditions, the weight ratio of the components (a):(b) is substantially variable; from 0 to 67% by weight, relative to the sum of (a)+(b), of component (b) can be present.

High-molecular weight, thermoplastic, aromatic polycarbonates according to component (b) according to the invention are the polycondensates obtainable by known processes (see, for example, Schnell, Chemistry and Physics of Polycarbonates, Interscience Publishers, 1964) by mixing diphenols, in particular dihydroxydiarylalkanes, with phosgene or diesters of carbonic acid, those dihydroxydiarylalkanes the aryl radicals of which carry a methyl group or halogen atoms in the o- and/or m-position to the hydroxyl group also being suitable, in addition to the unsubstituted dihydroxydiarylalkanes. Branched polycarbonates are likewise suitable (see, for example, German Patent Specification No. 2,500,092).

These polycarbonates have mean weight average molecular weights $\overline{M}w$ between 10,000 and 100,000, preferably between 20,000 and 40,000, determined by measurements of the relative viscosity in $CH_2Cl_2$ at 25° C. and at a concentration of 0.5% by weight.

Examples of suitable diphenols are hydroquinone, resorcinol, 4,4'-dihydroxydiphenyl, bis-(hydroxyphenyl)-alkanes, such as, for example, $C_1$-$C_8$-alkylene- or $C_2$-$C_8$-alkylidenebisphenols, bis-(hydroxy-phenyl)-cycloalkanes, such as, for example, $C_5$-$C_{15}$-cycloalkylene- or $C_5$-$C_{15}$-cycloalkylidenebisphenols, bis-(hydroxy-phenyl) sulphides, bis-(hydroxy-phenyl) ethers, bis-(hydroxy-phenyl) ketones, bis-(hydroxy-phenyl) sulphoxides or bis-(hydroxy-phenyl) sulphones. Furthermore, $\alpha,\alpha'$-bis-(hydroxyphenyl)diisopropylbenzene and the corresponding compounds which are alkylated in the nucleus or halogenated in the nucleus.

Preferred polycarbonates according to component (b) are those which contain, as repeating bifunctional structural units (in addition to the customary monofunctional structural elements, if appropriate, and any customary structural elements which are trifunctional or more than trifunctional), only those of formula (I) below:

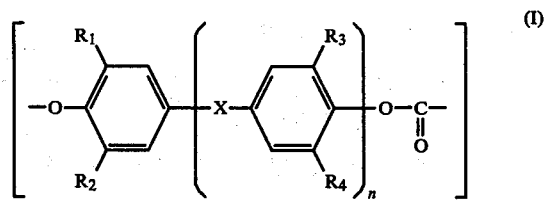

wherein

X is $C_1$-$C_5$-alkylene, $C_2$-$C_5$-alkylidene, $C_6$-cycloalkylene, $C_6$-cycloalkylidene, a single bond, O, S or $SO_2$, $R_1$ to $R_4$ are identical or different and are H, Cl, Br, $CH_3$ or $C_2H_5$, and n is 0 or 1.

Particularly preferred polycarbonates are those based on 2,2-bis-(4-hydroxy-phenyl)-propane (bisphenol A), 2,2-bis-(4-hydroxy-3,5-dichloro-phenyl)-propane (tetrachlorobisphenol A), 2,2-bis-(4-hydroxy-3,5-dibromophenyl)-propane (tetrabromobisphenol A), 2,2-bis-(4-hydroxy-3,5-dimethyl-phenyl)-propane (tetramethylbisphenol A) and 1,1-bis-(4-hydroxy-phenyl)-cyclohexane (bisphenol Z).

Further information concerning aromatic polycarbonates and their preparation and use is given, for example, in U.S. Pat. Nos. 3,028,365, 3,275,601 and 3,062,781.

Polyolefines suitable according to the invention (component c) are polymers of aliphatic unsaturated hydrocarbons, such as, for example, ethylene, propylene, butylene or isobutylene, which are obtained by customary processes, for example free radical polymerisation, and have mean weight average molecular weights $\overline{M}w$ (measured by gel-chromatographic methods) between 5,000 and 3,000,000. Both high-pressure polyolefine and low-pressure polyolefine can be used. The unsaturated hydrocarbons can also be copolymerised in a known manner with other vinyl monomers, such as, for example, vinyl acetate, acrylic acid or acrylates, the proportion of vinyl monomers being 30% by weight at most, preferably up to 25% by weight.

High-molecular weight, segmented, thermoplastically processable aromatic polycarbonates which contain hydrogenated dimeric fatty acid esters as condensed units and which are suitable according to the invention as component (a), and their preparation are described in German Offenlegungsschrift (German Published Specification) No. 2,935,317.

They have mean molecular weights Mw (weight average) from 25,000 to 200,000, preferably from 40,000 to 150,000, determined by the light scattering method, using a scattered light photometer. The relative solution viscosities $\eta_{rel}$ (measured on solutions of 0.5 g in 100 ml of $CH_2Cl_2$ at 25° C.) are between 1.2 and 3, preferably between 1.25 and 3.

These products are preferably obtainable by the reaction of hydrogenated dimeric fatty acid esters containing terminal hydroxyarylcarbonate groups of the formula (II)

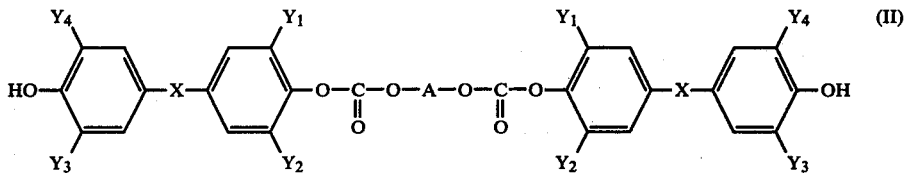

wherein
—O—A—O— is the divalent diolate radical of aliphatically hydroxyl-terminated hydrogenated dimeric fatty acid esters having $\overline{M}n$ (number average of the molecular weight) of from 800 to 20,000, preferably from 1,000 to 15,000, and in particular from 2,000 to 10,000,
X is a single bond, —$CH_2$—,

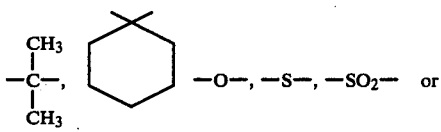  —O—, —S—, —$SO_2$— or

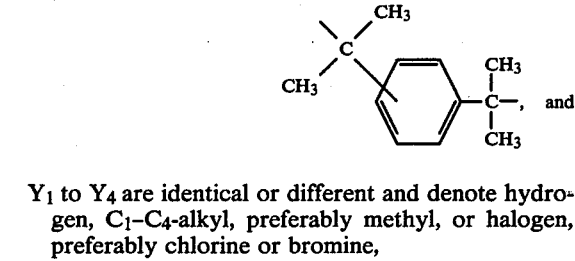

$Y_1$ to $Y_4$ are identical or different and denote hydrogen, $C_1-C_4$-alkyl, preferably methyl, or halogen, preferably chlorine or bromine,
with other diphenols, chain interrupters and carbonic acid-halides and, if appropriate, branching agents, according to the known process of phase boundary polycondensation, these products containing between 5 and 70% by weight, preferably between 20 and 65% by weight, of hydrogenated dimeric fatty acid esters as condensed units, and between 95 and 30% by weight, preferably between 80 and 35% by weight, of aromatic carbonate structural units based on other diphenols.

Examples of other diphenols which are suitable are hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) sulphoxides, bis-(hydroxyphenyl) sulphones and α,α-bis-(hydroxyphenyl)-diisopropylbenzenes, and their compounds which are alkylated in the nucleus and halogenated in the nucleus. These and further suitable diphenols are listed, for example, in U.S. Pat. Nos. 3,271,367 and 2,999,846, and in German Offenlegungsschriften (German Published Specifications) Nos. 2,063,050 and 2,211,957.

Other diphenols which are suitable are in particular those of the formula (III)

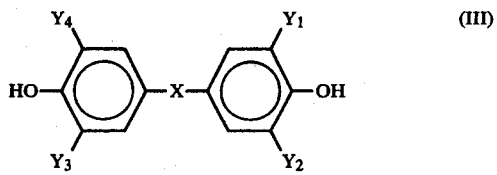

wherein
X denotes a single bond, —$CH_2$—,

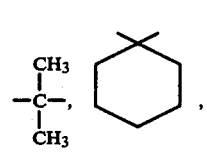

O, S, $SO_2$ or

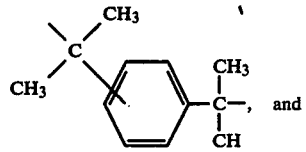

$Y_1$ to $Y_4$ are identical or different, and denote hydrogen, $C_1-C_4$-alkyl, preferably methyl, or halogen, preferably chlorine or bromine.

Examples of other diphenols which are suitable are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Examples of other diphenols which are preferred are 2,2-bis-(4-hydroxyphenyl)-propane, 1,1-bis-(4-hydroxyphenyl)-cyclohexane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane, bis-(3,5-dimethyl-4-hydroxyphenyl)-methane and bis-(4-hydroxyphenyl) sulphide.

The suitable diphenols can either be employed individually or several of them can be employed together.

Suitable branching agents are those having three or more than three functional groups, in particular those having three or more than three phenolic hydroxyl groups, it being necessary to maintain the customarily known amounts of branching agents of between 0.05 and 2 mol %, relative to incorporated diphenols. The preparation of branched polycarbonates is described, for example, in DT-OS (German Published Specification) No. 1,570,533 and DT-OS (German Published Specification) No. 1,595,762, and in U.S. Pat. No. 3,544,514 or U.S. Pat. No. Re. 27,682.

The customarily used phenols, such as, for example, p-tert.-butylphenol, p-isooctylphenol, p-chlorophenol, 2,4,6-tribromophenol and phenol, can be employed as chain interrupters, in the customary amounts which are determined by the particular molecular weight of the polycarbonate elastomers which is to be established.

Hydrogenated dimeric fatty acid esters which are suitable as segments are aliphatic hydroxyl-terminated polyesters obtainable from hydrogenated dimeric fatty acid having a molecular weight (number average) $\overline{M}n$ of about 300 to 800, preferably 500 to 600, and a diol, the hydroxyl-terminated polyesters being obtainable in a known manner, using an excess of diol compared with the hydrogenated dimeric fatty acid, for example in the presence of esterification catalysts and at temperatures between 150° and 200° and reaction times between 20 hours and 50 hours. The suitable hydrogenated dimeric fatty acid esters have mean molecular weights (number average) $\overline{M}n$ from 800 to 20,000, preferably from 1,000 to 15,000 and in particular from 2,000 to 10,000.

The desired molecular weight of the hydrogenated dimeric fatty acid esters is regulated in a known manner in each case by means of a particular reactant ratio of diol to hydrogenated dimeric fatty acid.

Hydrogenated dimeric fatty acid is understood as meaning the hydrogenated dimerisation product of unsaturated fatty acids ($C_{18}$), such as tall oil acid, linoleic acid and linolenic acid. The preparation and the structure of the dimerised fatty acid are described in J. Am. Chem. Soc. 66, 84 (1944) and in U.S. Pat. No. 2,347,562. The preferred commercially available dimeric fatty acid compositions are virtually free of monomer fractions and high trimer fractions, and are completely saturated. A hydrogenated dimeric fatty acid prepared, for example, by dimerisation of linoleic acid or tall oil fatty acid and subsequent hydrogenation is preferred. It is also possible to use mixtures of dimeric fatty acids and trimeric fatty acids for this purpose.

Ethylene glycol, propylene 1,2-glycol and propylene 1,3-glycol, butane-1,2-diol, butane-2,3-diol, butane-1,3-diol and butan-1,4-diol, pentanediols, neopentyl glycol, hexanediols, for example hexane-1,6-diol, trimethylhexanediol, octane-1,8-diols, decanediols, dodecanediols, octadecanediols, 2,2-dimethyl-1,3-propanediol 2,2-dimethyl-3-hydroxypropionate, diethylene glycol, triethylene glycol, tetraethylene glycol, dipropylene glycol, tripropylene glycol, tetrapropylene glycol, cyclohexane-1,4-dimethanol, cyclohexane-1,1-dimethanol, perhydrobisphenols, for example 4,4'-(1-methylethylidene)-bis-cyclohexanol, and 2,2-bis-(4-(2-hydroxyethoxy)-phenyl)-propane, if appropriate mixed with one another, may be mentioned as examples of suitable diols.

Polyhydric alcohols, such as, for example, glycerol, butane-1,2,4-triol, trimethylolethane, trimethylolpropane, trimethylolbutane, pentaerythritol, tetroses, di- and trimethylolpropane, pentoses, 2,2,6,6-tetrakis-(hydroxymethyl)-cyclohexane, hexoses, dipentaerythritol and tri-pentaerythritol, can also be used concomitantly. Ethylene oxide adducts or propylene oxide adducts to such polyols, provided that they do not exceed an average number of 60 carbon atoms per molecule, and polyethylene glycols, polypropylene glycols and polybutylene glycols are also suitable.

Further details of the preparation of the component (a) of the mixtures according to the invention can be obtained from the abovementioned DE-OS (German Published Specification) No. 2,935,317.

The preparation of the mixtures according to the invention, of the components (a) and (c) and, if appropriate, (b), is effected in a customary manner by any desired process, for example by mixing and co-extrusion of the individual components as such, in single-screw or twin-screw extruders, at temperatures preferably between 250° C. and 300° C., or in special cases, via the solutions of the corresponding components in inert organic solvents, such as, for example $CH_2Cl_2$ or chlorobenzene, with mixing and subsequent devolatilisation in devolatilising extruders.

The mixtures according to the invention have a surprisingly good spectrum of properties. In particular, they have a reduced stress cracking tendency, in particular with respect to supergrade petrol, and this tendency is further coupled with an improved low-temperature impact strength (up to about −40° C.).

Thus, the mixtures according to the invention, which can be processed in the customary manner, analogously to the two-component mixtures which are already known and comprise the components (b) and (c), to give shaped articles, films, etcetera, are preferably employed in the automobile sector, for example for the production of profiled components, bumpers, bodywork components and similar shaped articles.

Dyestuffs, pigments, stabilisers to heat and the action of UV light, fillers, glass fibres, flameproofing agents and the like can be added to the mixtures according to the invention in the customary manner. Suitable additives of this type are those which are suitable for thermoplastic aromatic polycarbonates.

Starting materials

1. Polycarbonate composed of bis-2-(4-hydroxyphenyl)-propane having an $\overline{M}w$ of 29,000 (determined by a scattered light measurement) and $\overline{M}n$ of 14,500 (determined by membrane osmosis), and prepared in a customary manner with a chain interrupter.

2. Polyethylene of high density, relatively low molecular weight and narrow molecular weight distribution: molecular weight $\overline{M}w$ (solution viscosity) 52,000; density: 0.962 g/cm$^3$, melt flow index: MFI 190/5=20 g/10 min.

3. Polycarbonate elastomer composed of 55% by weight of a hydrogenated dimeric fatty acid hexanediol polyester ($\overline{M}n$ approx. 4,000) and 45% by weight of bisphenol A polycarbonate.

3a. Hydrogenated dimeric fatty acid polyester having terminal aliphatic OH groups and a calculated molecular weight of approx. 4,000.

4.368 kg (7.8 mols) of hydrogenated dimeric fatty acid, 1.074 kg (9.1 mols) of hexane-1,6-diol and 0.85 kg of xylene are mixed, and the mixture is slowly heated to a reflux temperature of 180° C. under nitrogen and while stirring. Within 6 hours, the bulk of the water of condensation can be separated off over a water separator. After 6.056 g of $SnCl_2.2H_2O$ have been added, the mixture is heated under reflux for a further 8 hours, until the water of condensation is completely separated off. The total amount of xylene is then distilled off under reduced pressure. An oil having an OH number of 30 (calculated 28.3) and an acid number of 1, corresponding to a mean molecular weight of 3,600, is obtained. The viscosity of this oil in 50 percent strength xylene solution is 29 sec.

3b. Hydrogenated dimeric fatty acid hexanediol polyester having terminal diphenylcarbonate groups of 2,2-bis-(4-hydroxyphenyl)-propane (bisphenol A) and a calculated molecular weight of approx. 4,400.

4.61 kg (1.16 mols) of a hydrogenated dimeric fatty acid polyester according to 3a., 0.497 kg (2.32 mols) of diphenyl carbonate and 0.530 kg (2.32 mols) of bisphenol A are initially introduced into an autoclave. The mixture is melted at 100° C., with equilibration under nitrogen. 06 ml of 40 percent strength NaOH ($\triangleq$ 35 ppm Na calculated on the basis of the weight) are added to this melt, as a catalyst. The pressure is then slowly reduced to 1–1.5 mm Hg in the course of 1 hour. Thereafter, the reaction mixture is heated to an internal temperature of 150° C. in the course of 1 hour, until the phenol formed has distilled off. The reaction mixture is treated for a further 2 hours at this temperature and under 1–1.5 mm Hg, until the bulk of the phenol has been split off.

Thereafter, a vacuum of 0.5 mm Hg is applied, and the condensation is continued for a further 2 hours at 150° C. At the end of the reaction, 421 g of phenol (96.3% of theory) have distilled off.

The oil obtained has an OH number of 27 (calculated 25) and an acid number of 1, corresponding to a mean molecular weight of $\overline{M}n$=4,000. The viscosity of this oil in a 50 percent strength xylene solution is 182 sec.

3c. 2.794 kg of the precursor 3(b), dissolved in 30 l of methylene chloride, are added to a solution of 1.532 kg (6.7 mols) of bisphenol A, 41.85 g of p-tert.-butylphenol and 1.415 kg of 45 percent strength NaOH and 30 l of distilled water. 1.181 kg of phosgene are passed in at 20°–25° in the course of 25 minutes, under a nitrogen atmosphere and while stirring, whilst the pH value is kept constant at pH 13 with 2.22 kg of 45 percent strength NaOH. After 8.05 g of triethylamine have been added, the mixture is stirred for 1 hour.

The organic phase is separated off, and washed successively with 2 percent strength phosphoric acid and finally with distilled water until it is free of electrolyte. After the water has been separated off, the organic solution is concentrated. The isolation of the high-molecular weight, segmented polycarbonate elastomer is effected by extrusion in an evaporation extruder at about 230°–240° C., under the conditions known for polycarbonate extrusion.

The analytical characteristic constants of the polycarbonate elastomer are: relative viscosity (0.5% in CH$_2$Cl$_2$)$\eta_{rel}$= 1.49. $\overline{M}n$ 10,878, $\overline{M}w$ 115,034, and U 9.57.

Differential thermal analysis of this product shows that a phase separation of the dimeric fatty acid hexanediol polyester soft segment (solidification temperature −50° C.) and the hard segment (solidification temperature approx. 135°–140° C.) is present both during the first heating process and during the second heating process.

4. Polycarbonate elastomer composed of 10% by weight of a hydrogenated dimeric fatty acid hexanediol polyester ($\overline{M}n$ approx. 4,000) and 90% by weight of bisphenol A polycarbonate.

0.564 kg of the precursor 3b, dissolved in 36 l of methylene chloride, is added to a solution of 36 l of distilled water, 3.982 kg of bisphenol A, 79.7 g of p-tert.-butylphenol and 3.146 kg of 45 percent strength sodium hydroxide solution. 2.625 kg of phosgene are passed in at 20°–25° C. in the course of 45 minutes, under a nitrogen atmosphere and while stirring, whilst the pH value is kept constant at pH 13 with 3.7 kg of 45 percent strength sodium hydroxide solution.

After 24.3 ml of N-ethylpiperidine have been added, the mixture is stirred for a further hour.

The organic phase is separated off, and washed successively with 2 percent strength phosphoric acid and finally with distilled water until it is free of electrolyte.

After the water has been separated off, the organic solution is concentrated. The isolation of the high-molecular weight, segmented polycarbonate elastomer is effected by extrusion in an evaporation extruder at about 270°–280° C., under the conditions known for polycarbonate extrusion.

The relative viscosity of the polycarbonate is $\eta_{rel}$= 1.30 (measured in 0.5% CH$_2$Cl$_2$ at 20° C.).

5. High-density polyethylene having a molecular weight which is substantially above that of the customary types of polyethylene.

Density: 0.949–0.953 g/cm$^3$

Melt flow index MFI 190/21.6=1.7–2.3 g/10 min.

6. Polyethylene copolymer composed of ethylene, acrylic acid and butyl acrylate and having a density of 0.924–0.930 g/cm$^3$ and a melt flow index MFI of 190/2.16=6–8 g/10 min.

EXAMPLES

Petrol test

1. Stress cracking test (SC test)

Standard small bars are clamped over a standard-radius template in such a manner that the outside fibre elongation E is 0.6%. The test bars stressed in this manner are immersed for 5 minutes in a test liquid (simulated supergrade petrol) consisting of a mixture of 50% of isooctane and 50% of toluene. Whether the samples break or the time after which they break on the template is registered in this test.

2. Immersion test

The samples are immersed for 5 minutes, without an addition load, in a test liquid consisting of a mixture of 50% of isooctane and 50% of toluene. After storage for 24 hours, the shaped articles are checked to determine whether they have become discoloured or note.

The formulations mentioned in the Examples were coloured dark grey in order to be able to recognise discolourations (pigment content approx. 1%) more easily.

Test of low-temperature impact strength (at −40° C.)

The tests are effected according to

1. DIN (German Industrial Standard) 53,453 correspond to ISO/R 179 (sample: standard small bar) and-/or 2. ASTM 256-56, corresponding to ISO/R 180 (Izod impact strength) (sample 63.5×12.7×3.2 mm)

COMPARATIVE EXPERIMENT 1

A standard injection-moulding type polycarbonate (starting material 1) having a molecular weight of approx. $\overline{M}w$ 29,000 shows the following characteristics in the test mentioned:

$a_n$ at $-40°$ C., according to DIN (German Industrial Standard) 6 kJ/m$^2$; according to Izod: 110 J/m.

SC test: breakage after 40–60 seconds.

Immersion test: no discolouration.

COMPARATIVE EXPERIMENT 2

A mixture of 98% by weight of a polycarbonate comprising bis-2-(4-hydroxyphenyl)-propane and 2% by weight of a polyethylene (starting material 2)

$a_n$ at $-40°$ C., according to DIN (German Industrial Standard): 6 kJ/m$^2$; according to Izod: 150 J/m.

SC test: breakage after 2 minutes.

Immersion test: no discolouration.

EXAMPLE 1

83% of a polycarbonate of bis-2-(4-hydroxyphenyl)-propane (starting material 1) were mixed with 17% of a copolycarbonate containing 55% by weight of a dimeric fatty acid hexanediol polyester (starting material 3).

$a_n$ at $-40°$ C., according to DIN (German Industrial Standard): 20 kJ/m$^2$; according to Izod: 1,000 J/m.

SC test: no breakage.

Immersion test: pronounced white discolouration.

EXAMPLE 2

A polycarbonate compound according to Example 3 is mixed with 5% of a polyethylene homopolymer (starting material 5).

$a_n$ at $-40°$ C., according to DIN (German Industrial Standard): 9 kJ/m$^2$; according to Izod: 143 J/m.

SC test: no breakage.

Immersion test: very little discolouration.

EXAMPLE 3

A mixture of a high-molecular weight segmented polycarbonate corresponding to starting material 4, with only 10% by weight of a dimeric fatty acid hexanediol polyester (molecular weight approx. 4,000) and 5% of a polyethylene copolymer comprising ethylene, acrylic acid and acrylic acid ester (starting material 6) has the following properties:

$a_n$ at $-40°$ C., according to DIN (German Industrial Standard): 10 kJ/m$^2$; according to Izod: 130 J/m.

SC test: no breakage.

Immersion test: no discolouration.

We claim:

1. A mixture comprising
   (a) a high-molecular weight, segmented, thermoplastically processable, aromatic polycarbonate containing 5 to 70% by weight of hydrogenated dimeric fatty acid esters as condensed units, alone or with,
   (b) another high-molecular weight, aromatic, thermoplastic polycarbonate,
and further comprising
   (c) a thermoplastic polyolefine,
the sum of the components (a)+(b) being between 98% by weight and 90% by weight and the amount by weight of component (c) being between 2% and 10%, relative to the total amount by weight of (a)+(b)+(c) (which amounts to 100% by weight), in each case, and the amount by weight of hydrogenated dimeric fatty acid ester as condensed units, being from 3 to 30% by weight, relative to the amount by weight of (a)+(b).

2. A mixture according to claim 1, in which the thermoplastic polyolefine of component (c) is polyethylene.

3. A mixture according to claim 1 or 2, in which the sum of components (a)+(b) is between 97% by weight and 94% by weight and the amount by weight of component (c) is between 3% and 6%, relative to the total amount by weight of (a)+(b)+(c) (which amounts to 100% by weight), in each case.

4. A mixture according to claim 1, in which the amount by weight of hydrogenated dimeric fatty acid ester as condensed units is from 5 to 20 by weight, relative to the amount by weight of (a)+(b).

5. A mixture according to claim 1, in which the mean weight average molecular weight $\overline{M}w$ of the polycarbonate of component (b) is between 20,000 and 40,000 determined by measurements of the relative viscosity in CH$_2$Cl$_2$ at 25° C. and at a concentration of 0.5% by weight.

6. A mixture according to claim 1, in which the mean weight average molecular weight Mw of the polycarbonate of component (a) is from 40,000 to 150,000, determined by the light scattering method, using a scattered light photometer.

7. A mixture according to claim 1, in which the polycarbonate of component (a) has been obtained by the reaction of a dimeric fatty acid ester containing terminal hydroxyarylcarbonate groups of the general formula

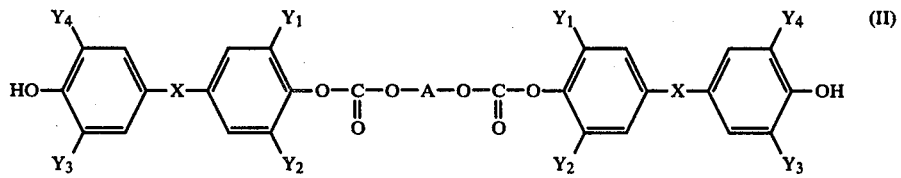

(II)

wherein
—O—A—O— is the divalent diolate radical of aliphatically hydroxyl-terminated hydrogenated dimeric fatty acid ester having $\overline{M}n$ (number average of the molecular weight) from 800 to 20,000, X is a single bond, —CH$_2$—,

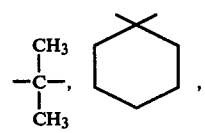

—O—, —S—, —SO$_2$— or

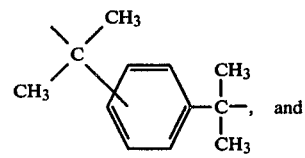

Y$_1$ and Y$_4$ are identical or different and denote a hydrogen atom, a C$_1$ to C$_4$ alkyl, or halogen atom, with another diphenol, a chain interrupter and a carbonic acid-halide and, if appropriate, branching agents, according to the phase boundary poly-condensation process so as to give a product containing between 5 and 70% by weight of hydrogenated dimeric fatty acid esters as condensed units and between 95 and 30% by weight of aromatic carbonate structural units based on other diphenols.

8. A mixture according to claim 7, in which the ester from which —O—A—O— is derived has $\overline{M}n$ from 1,000 to 15,000.

9. A mixture according to claim 8, in which the ester from which —O—A—O— is derived has $\overline{M}n$ from 2,000 to 10,000.

10. A mixture according to claim 7, in which $Y_1$ and $Y_4$ are identical or different and denote a hydrogen atom, a methyl group or a chlorine or bromine atom.

11. A moulding or film whenever formed of a mixture according to claim 1.

* * * * *